April 12, 1927.  W. M. VENABLE  1,624,376
BATCHING APPARATUS
Filed March 7, 1924    2 Sheets-Sheet 1
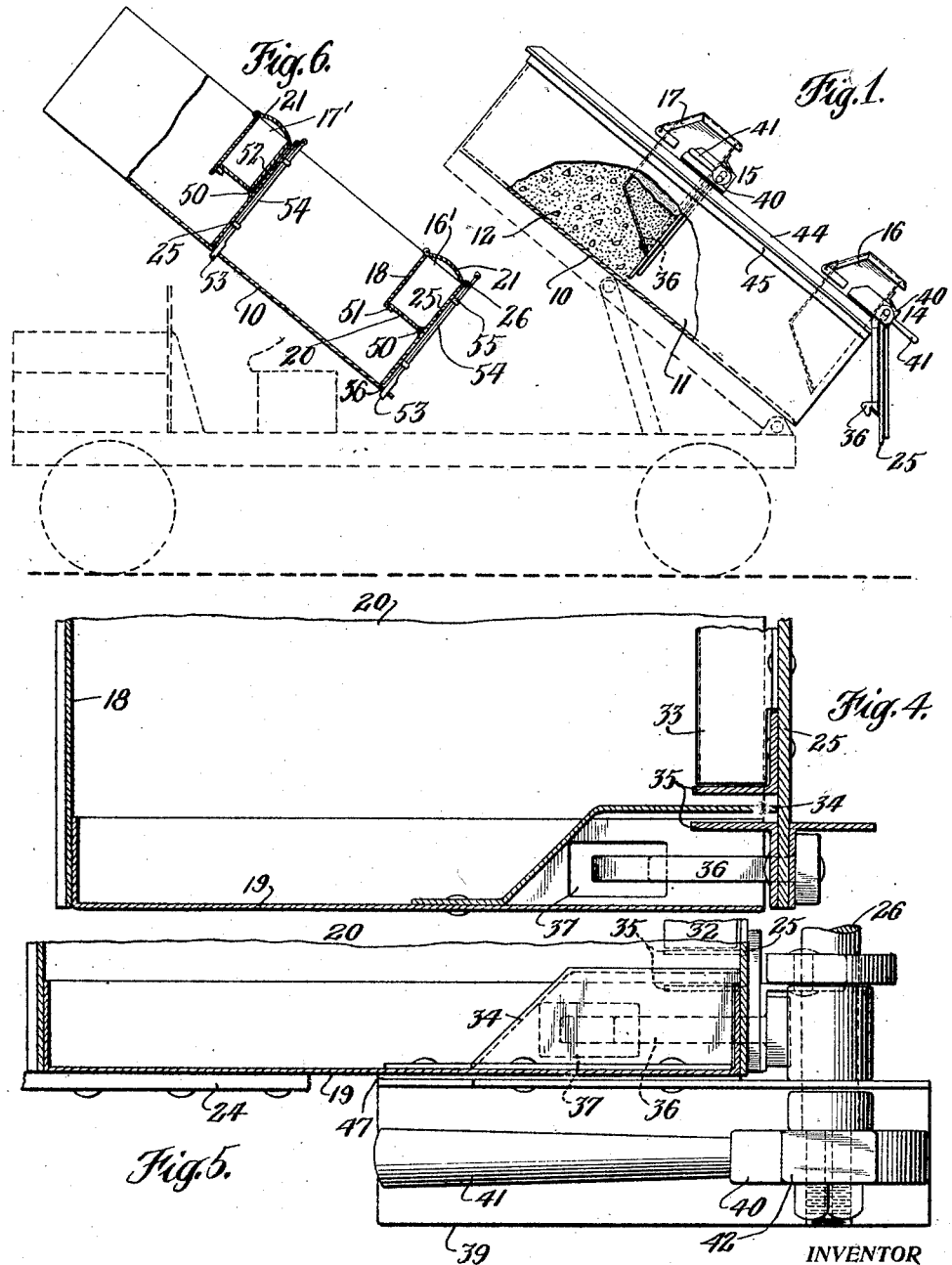
INVENTOR
William M. Venable
BY
Synnestvedt & Lechner
ATTORNEYS

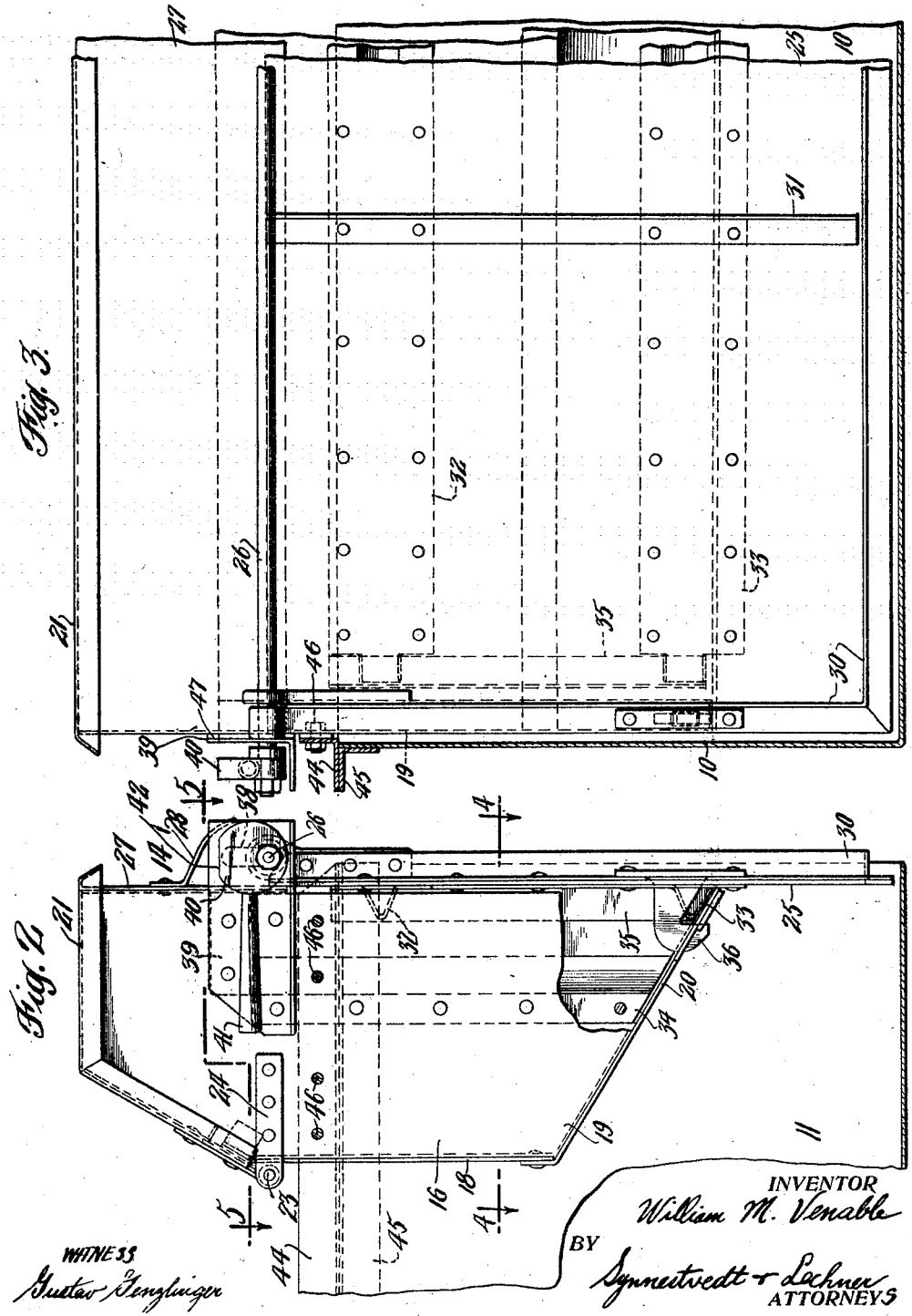

Patented Apr. 12, 1927.

1,624,376

UNITED STATES PATENT OFFICE.

WILLIAM MAYO VENABLE, OF PITTSBURGH, PENNSYLVANIA, ASSIGNOR TO BLAW-KNOX COMPANY, A CORPORATION OF NEW JERSEY.

BATCHING APPARATUS.

Application filed March 7, 1924. Serial No. 697,483.

My invention relates to what may conveniently be termed batching apparatus, and more particularly to apparatus for keeping separate and delivering or dumping as wanted different materials that are to be used concurrently or together. Examples of such batching apparatus are the bodies of motor trucks used for hauling ingredients for concrete.

Various objects and advantages of the invention will appear from my explanation hereinafter of its use in connection with concrete work on roads and the like, and from my description of the best embodiments of the invention known to me with special reference to their use in road building.

In building concrete roads and road foundations, it is customary to grade the roadway with a steam shovel or the like a long distance ahead of the actual paving work: indeed, it is quite common to have the grading practically completed (except for the final finishing up and levelling of the surface) several miles ahead of the actual concreting operations. The roadway is usually graded just to the width necessary to receive the pavement, which for concrete roads is generally about 18 feet, more or less; so that at the point where the mixer is operating and the concrete being placed in the roadway, very little extra room is available. Generally, of course, the materials for the concrete have to be hauled over the graded roadway ahead of the mixer (and of the fresh concrete just placed on the grade); and to avoid congestion in the limited space where work is going on around the mixer, it is customary to drive motor trucks with the mineral aggregate that is to be mixed with cement to form the concrete within one or two hundred feet of the mixer (where a turntable is generally provided to turn them around), and then back them up to the mixer and dump their loads into the latter.

In present practice, the mineral aggregate for each charge of the mixer generally consists of about 12 cu. ft. of sand and 18 cu. ft. of broken stone or gravel. Small trucks haul only one such batch of sand and stone at a load; others, large enough to carry several such batches, are provided with cross partitions to divide them up into separate compartments or containers for the individual batches. After dumping its first batch into the mixer hopper, such a truck is drawn a few feet away to await disposal of this batch by the mixer before backing up to it again and depositing another batch,—and so on until all the batches in the truck (up to a maximum of four, according to present practice) have been dumped.

The cement used in the concrete is not hauled in the same batch with the sand and stone, because the latter are more or less wet, and hence likely to injure the cement in transit. In order to obviate the congestion, inconvenience, and delay that would result from periodically unloading trucks of cement right at the mixer as required, it is customary to haul the cement independently of the mineral aggregate, and to store it in piles along the side of the grade. As a great deal of cement is required, and as it cannot well be "planted" in this manner very far ahead of the mixer,—on account of its deterioration with prolonged exposure or in case of rain,—this separate hauling proves a great nuisance; for it necessarily causes congestion and interferes with the free and undelayed stream of stone and sand trucks to and from the mixer on which regular, continuous, economical operation depends. And besides the labor and expense of loading, hauling, and unloading and placing the cement along the roadway, this practice requires the continuous services of some four extra men at the mixer (when the latter is of ordinary size) to handle the bags of cement and empty them into the mixer,—to say nothing of the annoyance and trouble of gathering the sacks and hauling them back to the warehouse, the considerable loss of sacks by carelessness, and the occasional damage to the cement (in transit or alongside the roadway) by wetting.

My invention makes it possible to do away with such disadvantages of present practice, by abolishing the separate hauling of cement. Even though the stone and sand be reeking wet, my invention permits the cement to be hauled in the same truck with them without any risk of dampening. It makes it possible to do away with handling of cement or sacks along the roadway or at the mixer, and allows all handling and emptying of sacks to be done at the warehouse, by the same force and in the same time now required to load the cement on the trucks that are used to haul it separately to the field of operations.

My present application is a continuation of my pending application Serial No. 599,529, filed November 7th, 1922, as to common subject matter disclosed and claimed, and in part bears a divisional relation thereto.

In the drawings, Fig. 1 is a diagrammatic side view of a motor truck body inclined or tilted to dumping position, the truck chassis and other parts being indicated in broken lines, and certain parts being broken away to expose various features of apparatus conveniently embodying my invention.

Fig. 2 is a fragmentary side view somewhat similar to Fig. 1, but on a larger scale, showing the truck body horizontal.

Fig. 3 is a fragmentary view as from the right of Fig. 2, showing the truck body in cross section,—certain parts being omitted.

Figs. 4 and 5 show fragmentary horizontal sections taken as indicated by the lines 4—4 and 5—5 in Fig. 2.

Fig. 6 is a view of a truck body similar to Fig. 1, on a smaller scale, showing different forms of construction.

The truck and the provisions for elevating or tilting its body 10 for dumping (see Fig. 1) may be of any preferred type and construction. As shown, the body or container 10 is in the form of a rectangular "box" open at top and rear, and affords two separated containers or compartments 11 and 12 for the two batches of sand and stone that it has capacity to carry. Ordinarily, the rear sides or ends of the compartments 11 and 12 are closed, and their contents retained even after the body 10 is tilted, by means of closure or partition structures or devices 14, 15. Containers or compartments 16, 17 (likewise counterparts of one another) are provided for separate transportation of the cement to be used with each batch of sand and stone. As here shown, these auxiliary cement compartments 16, 17 are associated and in a manner combined with the closure or partition devices 14, 15, as unitary structures that can very easily be installed in or removed from almost any truck body 10, and can readily be substituted for the usual partitions of trucks heretofore in general use. The entire devices or structures 14, 15 here shown being just alike, and similarly mounted in the body 10, it will suffice to describe the former.

Referring, now, to Figs. 1, 2, 3, 4 and 5, it will be seen that the auxiliary compartment 16 of the device 14 is in the form of a transverse sheet metal pocket with upright side wall 18, ends 19, and bottom 20,— the latter in the present instance sloping rearward somewhat, as shown, and being preferably of heavier plate, on account of the extra severe abrasion and wear to which it is subjected. To close the upper end or top of the compartment 16 and provide conveniently for filling it with cement, a sheet metal cover 21 (with downturned or flanged edges to overlap the compartment walls and make a weatherproof joint) is hinged on a transverse pivot rod 23 extending across the forward upper edge of the pocket and mounted in brackets or clips 24 secured to the compartment walls. At one side of the compartment 16 is a transversely extending metal plate 25 which not only forms its lateral wall, but also closes the whole rear side or end of the main compartment 11 with which the structure 14 is functionally associated. This plate 25 is movable to serve as a discharge gate for the main compartment 11, and also controls the discharge from the compartment 16. As shown in Figs. 2 and 3, the plate 25 is suspended to swing fore and aft in the body 10, from a pivot rod 26 extending across the body, and itself mounted as hereinafter described. In the construction here illustrated, the compartment walls 18, 19, 20 are fixedly mounted relatively to the body 10, and the plate 25 is at the rear side of the compartment 16 and serves directly as a gate therefor, as well as for the compartment 11.

The gap that would otherwise exist between the upper edge of the plate 25 and the top of the cover 21 is closed by a transverse plate 27 secured at its ends to the walls 19, and of sufficient width to be slightly but closely overlapped and pressed against by the upper edge of the plate 25; and further protection against the weather is afforded at this point by a sort of overhanging curved sheet metal eaves 28 secured to the plate 27.

It will be seen, therefore, that so long as the gate 25 remains in the closed position shown in Figs. 2 and 3, the materials in the two compartments 11 and 16 are held and kept separate and out of contact with one another, without opportunity for the one to become wet from the other, and the contents of the compartment 16 are also fully protected from the weather. When, however, the truck body 10 is tilted and the gate 25 released to swing and open rearward and outward under the influence of gravity as shown in Fig. 1, free passage is afforded for the gravitational discharge of the sand and stone from the compartment or container 11 beneath the compartment or container 16 and the gate 25. At the same time, also, the cement from the compartment 16 is likewise automatically released and discharged downward upon, into, and with the rush of sand and stone, and carried with them into the mixer. Thus there is no chance for the cement to stick to the wet interior of the body 10, because it never comes in contact therewith; while the sand and stone not only make a clean sweep of everything into the mixer, but also exert a scouring and cleaning effect on the interior of the body.

The action when the other compartment 12 is discharged is the same,—except, of course, that its contents have further to slide.

Passing, now, to other features and details of construction and operation, it will be observed, in the first place, that the gate plate 25 is reinforced and stiffened around its outer edges by external angle bars 30, and elsewhere by external vertical angle bars 31 and internal horizontal V shaped sheet metal stiffeners 32 and 33. The last of these, it will be seen, seats and makes a tight joint against the bottom plate 20 when the gate 25 is closed, as shown in Fig. 2. When the gate 25 closes, it also seats more or less closely against the edges of inward joggled vertical plates 34 secured to the compartment walls 19; and this joint is additionally protected and made practically tight by vertical sealing angle flanges 35, 35 on the gate that close on either side of each plate 34.

As shown in Figs. 2, 3, 4 and 5, the gate 25 is normally held closed by engagement of inward projecting bevel-ended latch hooks 36 at its vertical edges over the edges of catch notches 37 in the bottom plate 20 within the narrow vertical chambers formed within the compartment 11 by the plates 34. When the gate is to be opened, the latches 36 can be disengaged and released by shifting the gate in its own plane, so as to shift them out of the notches 37. As shown, this is accomplished by lifting the ends of the gate pivot rod 26, which extend through vertical guide slots 38 in angle bar brackets 39 secured to the compartment walls 19 above the body 10, and projecting rearward. As a convenient means of lifting the ends of this rod 26 together (and thus releasing the latches 37, 37 simultaneously), an eccentric 40, with handle 41, is non-rotatably secured to each end of the rod, so as to bear on the outward projecting horizontal bracket flange. Thus the gate 25 may be released and opened or set to lock itself shut on closing by manipulating either handle 41, as most convenient at the moment.

When the eccentrics 40 are in locking adjustment, the handles 41 extend forward beside the brackets 39 (Fig. 2); while for releasing adjustment, they extend rearward in a conspicuously exposed position (Fig. 1). The weight of the handles 41 and of the gate 25 itself naturally prevents release of the gate 25 by jarring, and flat surfaces 42 on the eccentric peripheries prevent partial, dangerously deceptive accidental closing rotation of the eccentrics when once set for release.
While, of course, the various wall plates 18, 19, 20 and 27 and the gate 25 might be more or less separately secured to the truck body 10 (in which case the lower portions, at least, of the plates 19 could be dispensed with), it is generally preferable to secure all these parts together independently of the body 10, as shown, so as to form one complete unit that can be easily and quickly mounted and secured in proper position in the body. By designing the compartments 16, 17 of ample depth and capacity and merely varying their mounting in the body 10, the structures 14, 15 can be standardized as to cross section or profile for truck bodies of a great many different shapes and styles; so that in order to adapt the standard line or design to extreme variations in truck width, it will only be necessary to vary the lengths of the pieces 18, 20, 21, 25, 27 etc., transversely of the body, which as a manufacturing proposition is generally much simpler and easier than to modify the profile.

A convenient method of mounting the units 14, 15 on the body 10 is to employ longitudinally extending angle bars 44 that can be secured to the usual top flanges 45 of the body with their own upstanding flanges to the inside, so that the units 14, 15 (and as many more like them as the size of the body 10 may demand) can be fitted between such flanges and secured to them by bolts 46 extending through the compartment walls 19. Thus the entire structure 14 or 15 can be easily and quickly removed for repair, or to permit use of the truck without it. Minor variations in width of bodies 10 or length of compartments 16, 17 can easily be accommodated or compensated for by interposing filler pieces 47 of appropriate thickness between walls 19 and angle bars 44, or by altering the width of the horizontal flanges of the bars 44 or their position on the body flanges 45, or both. Variations of bodies 10 in depth can be taken care of in the manner indicated above, by merely varying the vertical position of the row of holes for the bolts 46 in the compartment walls 19 so as to give the proper depth of opening (some 6 or 8 inches, say) below the compartments 16, 17, and the proper working clearance at the lower edges of the doors 25.

From the foregoing description of the construction shown in Figs. 1–5, it will be seen that the gate means of the main container 11 and of the corresponding auxiliary compartment 16 are not only mounted and combined for swinging movement together relative to both container and compartment, but are structurally consolidated or merged in the one plate 25. In the type of construction illustrated in Fig. 6, and now to be described, the gate means of main containers and auxiliary compartments are likewise mounted and combined to move together, though not merged or consolidated.

As shown in Fig. 6, the auxiliary compartments 16′, 17′ are mounted against the main gates 25, 25, as in Figs. 1–5. Instead of being fixed, however, the bottom plates 20, 20 of these auxiliary compartments 16′, 17′ are movable, to serve as gates for the discharge of material from those compartments. For this purpose, they are attached to the gate plates 25, 25, so as to swing with them when they open. To facilitate the discharge of cement from the compartments 16, 17 (especially if the cement be tightly packed), each such bottom gate 20 may be pivoted or hinged to the corresponding main container gate 25 as indicated at 50, and suitable means may be provided for sustaining this gate 20 in closed position (as shown) when the main gate 25 is closed. E. g., the front compartment wall 18 may have a flange 51 along its lower edge for the free edge of the bottom plate 20 to rest on, or a couple of lugs. With such an arrangement, the compartment bottom 20 will drop and swing down against the main gate 25 as it swings rearward with the latter,—thus discharging or dumping the cement directly downward on the material discharging below.

The main gate 25 forms the rear wall of the compartment 16′ in Fig. 6, just as in Figs. 1–5; and thus this compartment 16 has a free discharge opening laterally to the rear when the main gate opens, as well as downward. The compartment 17, on the other hand, is here shown with a separate, fixed rear wall 52 of its own. In both cases, however, the discharge of the auxiliary compartment 16′ or 17′ is directly controlled by the opening of the main gate 25, as in Figs. 1–5.

As here shown, the fixed compartment walls 18, 52 are attached directly to the side walls of the truck body 10, instead of to separate end walls as in Figs. 1–5. Instead of lifting the main gate 25 and the attached auxiliary gate 20 bodily to release and discharge them, as in Figs. 1–5, a movable latch bolt 53 may be provided, with an operating rod 54 extending through guides 55 to the top edge of the gate, as shown.

In Fig. 6, various parts and features are marked with the same reference characters as in Figs. 1–5, as a means of dispensing with merely repetitive description.

I claim:

1. The combination of a dumping container and an auxiliary compartment, with gate means for simultaneously controlling their discharge combined for movement together relative to both container and compartment.

2. The combination of a dumping container and a laterally discharging auxiliary compartment, with a common lateral gate for said container and said compartment.

3. The combination of a dumping container with laterally swinging discharge gate and an auxiliary compartment mounted in said container against said gate, with lateral discharge opening normally closed thereby.

4. The combination of a dumping container and an auxiliary compartment fixed thereon with passage therebeneath for discharge of material from said container, and gate means for controlling their discharge mounted and combined to swing together relative to both container and compartment.

5. The combination of a dumping container and a laterally discharging auxiliary compartment, with a laterally swinging gate for said container also controlling the discharge from said compartment, and latch means for holding said gate shut releasable by shifting the gate in its own plane.

6. An auxiliary compartment structure adapted to be mounted on a tilting dump container, said structure comprising gate means for simultaneously controlling the discharge of compartment and container, mounted and combined for movement together relative to both.

7. An auxiliary compartment structure adapted to be mounted on a tilting dump container, said structure comprising a lateral discharge gate adapted to serve also as a gate for said container.

8. An auxiliary compartment structure adapted to be fixed on a tilting dump container with passage beneath the compartment for discharge of material from said container, said structure comprising a laterally swinging discharge gate for the compartment extending below it to control the discharge through such passage.

9. An auxiliary compartment structure adapted to be mounted on a tilting dump container with passage beneath the compartment for discharge of material from said container, said structure comprising a gate pivoted to swing laterally and discharge both compartment and container, latch means for holding said gate shut, and means for lifting the gate by its pivotal means to release said latch means and allow the gate to open.

In testimony whereof, I have hereunto signed my name.

WILLIAM M. VENABLE.